United States Patent [19]

Dubois et al.

[11] Patent Number: 4,543,306

[45] Date of Patent: Sep. 24, 1985

[54] ELECTROCHEMICAL DEVICE WHICH CAN BE USED FOR ENERGY STORAGE

[75] Inventors: Jean C. Dubois; Gérard Tourillon; Francis Garnier, all of Paris, France

[73] Assignee: Thomson-CSF, Paris, France

[21] Appl. No.: 499,788

[22] Filed: May 31, 1983

[30] Foreign Application Priority Data

Jun. 1, 1982 [FR] France .................. 82 09513

[51] Int. Cl.[4] .................. H01M 4/60; G02F 1/01
[52] U.S. Cl. .................. 429/194; 429/213; 350/357
[58] Field of Search ............. 429/213, 194; 350/357

[56] References Cited

U.S. PATENT DOCUMENTS

| 3,185,590 | 5/1965 | Mayer et al. | 429/194 |
|---|---|---|---|
| 4,181,779 | 1/1980 | Teo | 429/213 X |
| 4,321,114 | 3/1982 | MacDiarmid et al. | 429/213 X |

FOREIGN PATENT DOCUMENTS

| 0027855 | 5/1981 | European Pat. Off. |
|---|---|---|
| 0036118 | 9/1981 | European Pat. Off. |
| 94536 | 8/1969 | France |

OTHER PUBLICATIONS

Journal De Chemie Physique vol. 76, No. 4, 1979 (FR) G. Tourillon et al., "Dopage Électrochemique de Films Minces de Poly THF Déposés sur Électrode DePlatine: Étude Spectroscopique XPS et SIMS".

Extended Abstracts, vol. 80-1, May 11–16, 1980, Abstract No. 427, A. F. Diaz et al., "Electrosynthesis and Study of Conducting Organic Polymers for Electrode Applications".

IBM Technical Disclosure Bulletin, vol. 24, No. 11A, Apr. 1982, A. F. Diaz et al.: "Poly-p-Nitrophenylpyrrole Films as Electrodes for Batteries".

Chemical Abstracts, vol. 93, 1980, Aug. 1980, No. 56812d, A. F. Diaz et al.: "Chemical Modification of a Polypyrrole Electrode Surface".

Journal of Polymer Science Polymer Letters Edition, vol. 18, 9–12 (1980), Takakazu Yamamoto et al.: "Preparation of Thermostable and Electric-Conducting Poly(2,5-Thienylene)".

*Primary Examiner*—Brian E. Hearn
*Assistant Examiner*—Stephen J. Kalafut
*Attorney, Agent, or Firm*—Oblon, Fisher, Spivak, McClelland & Maier

[57] ABSTRACT

The invention relates to electrochemical devices and in particular energy storage devices.

The object of the invention is the use in such devices of at least one conductive support, covered by a polymer film, obtained by electrochemical polymerization of at least one monomer having at least one aromatic heterocycle with five links containing a single heteroatom, the polymer being in accordance with the general formula: $(M^+X^-y)n$. The basic monomer is a pyrrole, thiophene, furan or indole and is substituted by at least one group of the alkyl, alkoxyl, hydroxyl aryl, substituted aryl, halogen, methyl trihalide, cyano, amino or dialkylamino type.

14 Claims, 2 Drawing Figures

ELECTROCHEMICAL DEVICE WHICH CAN BE USED FOR ENERGY STORAGE

BACKGROUND OF THE INVENTION

1. Field of the Invention

The present invention relates to electrochemical devices and more particularly to their use for energy storage, in the form of batteries or cells, incorporating electrodes obtained by electrochemical polymerization of a heterocyclic monomer on an electrically conductive support.

Energy storage normally takes place by means of storage batteries, which have a limited number of charging/discharging cycles and large overall dimensions, or cells, which have small overall dimensions, but which cannot be recharged. Thus, it would appear to be difficult to obtain energy storage devices, which have both reduced overall dimensions, which are recyclable and which are reliable over a period of extended use. An increasing need exists for devices which can provide an emergency or standby supply for electronic or electrical systems, which are particularly sensitive, to even brief interruptions in their supply, due e.g. to current interruptions. This is particularly the case with equipment used in the informatics field or members forming telephone exchanges, in order to preserve data stored in memories.

2. Description of the Prior Art

In order to meet these demands, attempts have been made to find devices, which can store a large amount of energy per unit of weight and which accept a large number of charging - discharging cycles. These devices are based on the properties of certain polymers made electrically conductive with the aid of doping agents and which can be used for producing battery electrodes. The advantages of batteries having active polymer elements are a large amount of energy stored per unit of weight and which is roughly twice that of conventional lead batteries, and a high number of charging - discharging cycles. Thus, batteries have been produced using basic polymers, such as polyacetylene, polyphenylene and phenylene polysulphide. However, these polymers have a serious disadvantage, which is the high sensitivity to oxygen. Over a long period, oxygen leads to a deterioration and breaking of the polymer chains. Moreover, particularly in the case of polyacetylene, when producing the electrolyte, it is necessary to use a solvent able to resist electrolysis during charging.

BRIEF SUMMARY OF THE INVENTION

In order to obviate these disadvantages, the present invention, which is due on the one hand to F. GARNIER and G. TOURILLON of the Laboratoire de Photochimie Solaire of C.N.R.S and J.C DUBOIS of THOMSON-CSF, proposes batteries using electrodes formed from conductive polymers obtained by the electrochemical polymerization of substituted heterocyclic compounds. These novel conductive polymers make it possible to obtain electrochemical energy storage devices having an improved life compared with existing batteries, as well as a high stability of the material constituting the electrodes.

Thus, the present invention specifically relates to an electrochemical device comprising a cell containing an electrolyte suspended in a solvent and at least a first and a second electrode in contact with this electrolyte, whereby at least the first electrode has a polymer film on a conductive support, said film being obtained by the electrochemical polymerization of at least one monomer M, said polymer complying with the general formula $(M^+X^-y)n$ in which $X^-$ represents an anion obtained from the electrolyte used during the polymerization process, y is the anion proportion related to one mol of monomer and n the degree of polymerization, wherein the monomer is either an heterocycle substituted by at least one of the groups $R_1$ and $R_2$ of general formula:

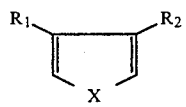

with $X = NH$, S or O, $R_1$ and $R_2$ being groups of the alkyl, alkoxyl, hydroxyl, aryl, substituted aryl, halogen, methyl trihalide, cyano, amino or dialkylamino type, or an indole substituted on the phenyl nucleus by at least one of the groups $R_3$, $R_4$, $R_5$, $R_6$ of general formula:

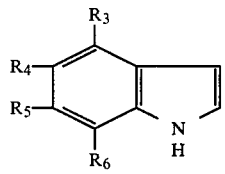

$R_3$, $R_4$, $R_5$ and $R_6$ being groups of the alkyl, alkoxyl, hydroxyl, aryl, substituted aryl, halogen, methyl trihalide, cyano, amino or dialkylamino type.

The invention also relates to a device used for storing and restoring energy by an oxidoreduction phenomenon.

The invention also relates to an electrochromic display system.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
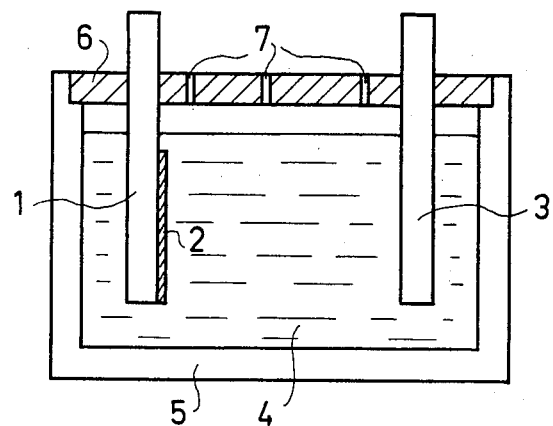
FIG. 1 a sectional view of the energy storing and restoring device according to the invention.

The description firstly relates to the way in which the conductors used by the invention are obtained and then relates to the construction of batteries using these materials.

The polymers are used in the form of films deposited on a conductive body. The polymer films according to the invention are obtained from monomers having at least one aromatic heterocycle with five links containing a single heteroatom. The monomer can be a derivative substituted in the three position, in the four position or in the three or four position of the pyrrole, thiophene or furan. It can be an indole substituted on the phenyl nucleus by 1 to 4 groups. The substitutions can be a group of the alkyl, alkoxyl, hydroxyl, aryl, substituted aryl, halogen, methyl trihalide, cyano, amino or dialkylamino type.

The polymerization of the monomer takes place in an electrolytic cell containing the monomer dissolved in an organic solvent, such as acetonitrile, tetrahydrofuran, methylene chloride or a water - acetonitrile mixture, in the presence of a conductive salt of formula $A^+X^-$. The $A^+$ cation can be an alkaline element, or an $N^+R_4$ ion (R being ethyl, butyl or an identical compound). The $X^-$ anion can be an ion of type $ClO_4^-$, $BF_4^-$, $PF_6^-$, $I^-$, $Br^-$ or an aryl sulphonate. For example, the monomer concentrations can be between $5.10^{-3}$ and 0.1 mol/liter, whilst the conductive salt concentrations can be between $10^{-2}$ and 1 mole/liter. During electrolysis, a polymer film is deposited on the conductive material used as the anode of the electrolytic cell. The anode can be metallic, e.g. of gold or platinum. It is also possible to use a metal such as gold or platinum-coated copper in order to reduce manufacturing costs. Following electrolysis, an anodic electrode will be obtained, which is formed by a conductive material coated with an adhesive polymer film.

The polymer film formed on the surface of the anodes contains a certain proportion of the anion obtained from the electrolyte and its general formula can be written in the form $(M^+X^-y)$ in which M represents the monomer, $X^-$ the anion or opposed ion, y the anion proportion in the polymer related to 1 mole of monomer and n the degree of polymerization. In the above formula, y is a factor which can vary between 0.1 and 0.5. The polymer and the anion form a charge transfer complex, whose conductivity varies between $10^{-2}$ and $10\Omega^{-1}$ cm$^{-1}$.

The monomers used in the devices according to the invention can be classified into two groups:

heterocycles substituted by at least one of the groups $R_1$ and $R_2$ of general formula:

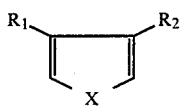

with X=NH, S or O, i.e. pyrrole, thiophene or substituted furan, indoles substituted on the phenyl nucleus by at least one of the groups $R_3$ to $R_6$ and of general formula:

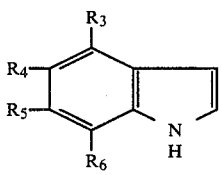

The $R_1$ to $R_6$ substitutions are the aforementioned groups.

Examples for the preparation of doped polymers of type $(M^+X^-y)n$ are given hereinafter.

EXAMPLE 1

This example describes the production of a doped polymer, in which the monomer is methyl-3-thiophene and the ion doping agent $ClO_4^-$.

Polymerization can take place in an electrolytic cell comprising the anode, the cathode and optionally a reference electrode, e.g. of calomel. The cell is filled with a solution containing $10^{-2}$ mole of methyl-3-thiophene and 0.1 mole of lithium perchlorate per liter of acetonitrile. For example, the anode is a platinum strip or plate. The cathode can be in the form of a platinum film. The solution is deoxygenated by dry argon scavenging for at least 30 minutes. The anode potential is fixed at 1.4 V relative to the reference electrode. By establishing a potential difference between the anode and the cathode, the solution is electrolyzed and the anode is then covered with a dark blue polymer film. The polymer obtained by this method is polymethyl-3-thiophene, which can be represented by the following chemical formula, determined by microanalysis:

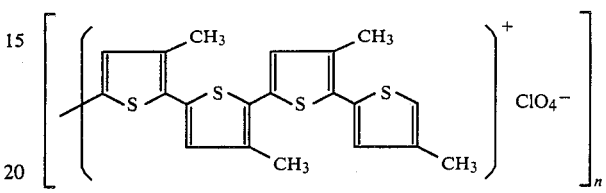

This polymer is stable in air and under vacuum up to temperatures exceeding 300° C. Its conductivity is between 10 and $100\Omega^{-1}$/cm$^{-1}$.

The electrode covered with its polymer film is rinsed in acetonitrile and can then be used as the anode in an electrochemical energy storage device.

By changing the electrolyte, it is possible to dope the polymer with other anions. For example, when using tetrabuylammonium hexafluorophosphate $N(Bu)_4^+Pf_6^-$ or tetrabutylammonium tetrafluoroborate $N(Bu)_4^+BF_4^-$, in the same concentration as the lithium perchlorate, a polymethyl-3-thiophene film is obtained doped with the anions $PF_6^-$ or $BF_4^-$.

EXAMPLE 2

This example describes the production of a doped polymer, in which the basic monomer is 5-cyanoindole of chemical formula:

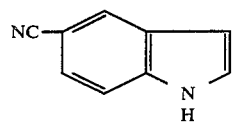

and in which the doping agent is the anion $ClO_4^-$.

The synthesis of the polymer takes place in the same way as that of polymethyl-3-thiophene, with a potential difference of 1.4 V between the anode and the reference electrode. The monomer and electrolyte concentrations are identical to those given in example 1. The electrolyte used can be lithium perchlorate.

The above examples make it possible to obtain by electrochemical oxidation, electrodes covered with a polymer film, doped by anions. During the discharge of electrochemical energy storage devices using organic electrodes, the electrons circulating in the discharge circuit pass from the least oxidized electrode (cathode) to the most oxidized electrode (anode) until the two electrodes reach the same oxidation state. An electrode covered with a polymer film doped by anions will consequently form the anode of an energy storage device. The cathode of such a device can be a simple metallic electrode or an electrode covered with a polymer doped by cations.

As the electrochemical polymerization of the monomer takes place on the anode of the electrolytic cell, it is not possible to directly obtain an electrode covered with a polymer doped by cations.

To obtain such a cathode, it is possible to make use of the previously obtained anode and subject it to a double reduction. A first electrochemical reduction is possible immediately following polymerization, by leaving the anode in the electrolytic cell and by causing the discharge of the cell. This discharge leads to the extraction of the anodes located within the polymer and an anion-depleted polymer is obtained, which contains sites which can be occupied by the cations. This can be followed by a second reduction, namely a chemical or an electrochemical reduction. Chemical reduction consists of impregnating the polymer in a solution containing the desired cations. These cations will occupy the sites left vacant by the original anions. To obtain a polymer doped by the cations $Li^+$, $Na^+$ or $K^+$, it is possible to use a solution of naphthalene lithium, naphthalene sodium or naphthalene potassium in tetrahydrofuran. Electrochemical reduction consists of placing the deionized electrode as the cathode in an electrolytic cell containing the desired cations in solution. These cations are then inserted into the sites left vacant by the original anions on electrolyzing the solution. The cations can be alkaline ions, such as sodium, potassium, lithium or compounds of the types $(Bu)_4N^+$ or $(Et)_4N^+$ from an electrolyte dissolving in a solvent, such as acetonitrile or tetrahydrofuran. The electrolyte concentration in the solution can be between $10^{-2}$ and 1 mole/1 liter of solvent.

It should be noted that it is consequently possible to obtain an electrode covered with a deionized polymer film, which can again be ionized. It is then possible to produce energy storage devices by using these electrodes as the anode and cathode, their doping in anions or cations taking place during the first charge.

The electrochemical energy storage devices, batteries or cells will therefore comprise at least one element incorporating:

an anode constituted by an electrode incorporating a polymer film doped by anions, a cathode constituted by a metallic electrode or by an electrode incorporating a polymer film doped by cations, an electrolyte constituted by a salt, whose ionic decomposition corresponds to the aforementioned anions and cations dissolved in a solvent, which can be acetonitrile, tetrahydrofuran, propylene carbonate, methylene chloride or a mixture of different solvents.

The thus obtained electrochemical devices will generally have the advantage, as a result of the polymers used, of having a higher redox potential than known devices using other polymers.

As a non-limitative example, the discharge characteristic of an energy storing and restoring device according to the invention has been plotted. Such a device is shown in FIG. 1, which is a sectional view. It comprises a single storage element constituted by:

an electrolytic tank 5 covered with a cover 6 having a number of holes 7, which permit the release of gases caused by electrolysis, an anode formed by a first platinum conductive element 1 covered with a polymethyl-3-thiophene film 2, doped by perchlorate ions $ClO_4^-$, a cathode constituted by a lithium electrode 3 or by an aluminium electrode covered with a lithium coating, an electrolyte 4 constituted by lithium perchlorate dissolved in tetrahydrofuran and whose concentration is 0.3 mole/liter of solvent.

Figure 2:
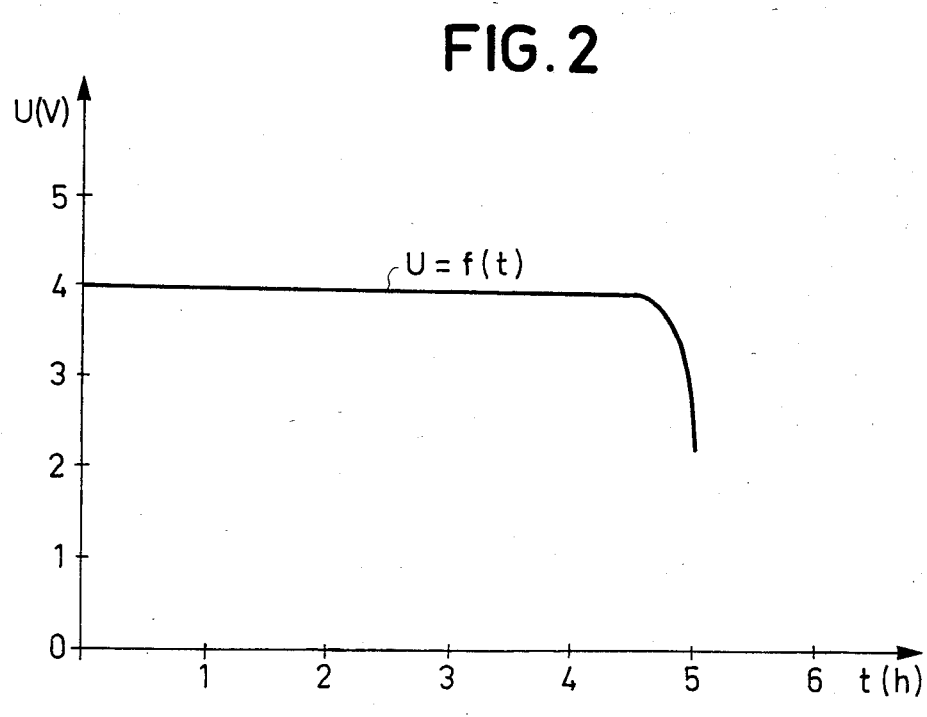
FIG. 2 the discharge characteristic of an energy storage device according to the invention.

FIG. 2 shows the discharge characteristic of a device of the type described hereinbefore. Curve $U=f(t)$ has been plotted, whilst maintaining the discharge current intensity constant and equal to 0.38 mA and for a doped polymer film weighing 25 mg. The device according to the invention can be compared with a battery according to the prior art. The known battery has in fact a lithium cathode and an anode having a polyacetylene layer. The following table gives the essential characteristics of the two devices and compares them.

|  | Polyacetylene anode | Polymethyl-3-thiophene anode |
| --- | --- | --- |
| Instantaneous power | 30,000 W/kg (for 18 mg) | 40,000 W/kg (for 10 mg) |
| Power supplied | 176 Whr/kg (for 3 mg) | 240 Whr/kg (for 3 mg) |
| Potential difference in open circuit between anode and cathode | 3.7 V | 4 V |
| Number of charging-discharging cycles | >20 | >20 |

In this table, the power values are given as a function of the weight of the polymer material on the anode. The potential difference between the anode and the cathode is given at the start of discharge. It can be seen that the device according to the invention is able to store more energy per unit of weight than the prior art device and that the power supplied is significantly higher. It can also be seen that, as a result of the novel polymer, the redox potential is higher than when using polyacetylene, so that there is a higher potential difference between the anode and the cathode of the device.

The polymer materials doped by anions or cations have the property of modifying their colour, as a function of their electrochemical state. During the charging or discharging of a device according to the invention, the polymer films deposited on the electrodes undergo oxidation and reduction cycles, with modification to the optical spectra. Thus, such a device can be used as an electrochemical display cell. In this case, it is advantageous for the device to give free access to an incident light beam on one of the polymer films, by choosing transparent materials for the production of the elements located on the path of the light beam.

The electrochemical cells according to the invention consequently make it possible to produce energy storage devices having numerous advantages compared with the prior art systems, namely higher redox potential, high inertia relative to the conventional solvents, greater thermal stability, better resistance to oxygen action, etc. They can be used as non-rechargeable cells, e.g. in the case where the cathode is made from an alkaline material which completely decomposes during discharge. They can also be combined to form storage batteries. Their electrochromic effects can be used in display devices, which may or may not be linked with their energy storage properties.

What is claimed is:

1. An electrochemical device comprising
a cell containing an electrolyte suspended in a solvent and at least a first and a second electrode in contact with this electrolyte, whereby at least the first electrode has a polymer film on a conductive support, said film being obtained by electrochemical polymerization of at least one monomer M, said polymer having a conductivity of $10^{-2}$ to $10^{+2}$ ohm$^{-1}$cm$^{-1}$ and complying with the general formula $(M^+X^-y)_n$ in which $X^-$ represents an anion obtained from the electrolyte used during the polymerization process, y is the anion proportion related to one mole of monomer and is 0.1 to 0.5, and n the degree of polymerization, wherein the monomer is either (a) an heterocycle substituted by at least one of the groups $R_1$ and $R_2$, of the formula

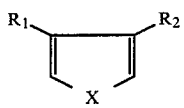

with

X=O, and $R_1$ and $R_2$ are alkyl, alkoxyl, hydroxyl, aryl, substituted aryl, halogen, methyl trihalide, cyano amino or dialkylamino.

2. A device according to claim 1, wherein the anion $X^-$ is an ion selected from the group consisting of $ClO_4^-$, $BF_4^-$, $PF_6^-$, $I^-$, $Br^-$ and an aryl sulphonate.

3. A device according to claim 1, wherein the conductive support is of platinum.

4. A device according to claim 1, wherein the conductive support comprises a platinum coating.

5. A device according to claim 1, wherein the second electrode is metallic.

6. A device according to claim 1, wherein the second electrode comprises an alkaline metal.

7. A device according to claim 1, wherein the second electrode also supports a polymer film obtained by electrochemical polymerization of the monomer M and in which cations have been substituted for the anions $X^-$.

8. A device according to claim 7, wherein the cations are alkaline ions or compounds of the type $(Bu)_4N^+$ or $(Et)_4N^+$.

9. A device according to claim 1, wherein said device is used for restoring energy by a electrochemical reduction phenomenon.

10. A device according to claim 1, wherein the said device is used for storing and restoring energy by an oxidoreduction phenomenon.

11. A device according to claim 10, wherein the electrolyte is a salt dissolved in an organic solvent, selected from the group consisting of acetonitrile, tetrahydrofuran, propylene carbonate, propylene chloride, and a mixture of these solvents.

12. A device according to claim 10, wherein the polymer of the first electrode comprises the anion $X^-=ClO^-_4$, the second electrode comprises lithium and the electrolyte is lithium perchlorate dissolved in tetrahydrofuran.

13. A device according to claim 10, wherein the second electrode is constituted by a lithium coating, deposited on an aluminium plate.

14. An electrochromic display system using an electrochemical device according to claim 1.

* * * * *